United States Patent

Heyer et al.

[15] 3,638,682
[45] Feb. 1, 1972

[54] TIMER VALVE

[72] Inventors: William T. Heyer, 225 Mohawk Road; Dale F. Soukup, 318 Mohawk Road, both of Santa Barbara, Calif. 93105

[22] Filed: Apr. 6, 1970

[21] Appl. No.: 25,763

[52] U.S. Cl..............................137/624.12, 251/20, 251/43, 251/54, 74/3.5
[51] Int. Cl..........................................................F16k 21/06
[58] Field of Search..................137/624.11, 624.12; 251/43, 251/54, 15, 20; 74/1.5, 3.5

[56] References Cited

UNITED STATES PATENTS

| | | | |
|---|---|---|---|
| 3,104,861 | 9/1963 | Heyer | 251/54 X |
| 2,852,072 | 9/1958 | Alfery | 137/624.11 |
| 3,254,870 | 6/1906 | Haessler | 251/43 |
| 3,063,297 | 11/1902 | Hyde | 137/624.11 X |

*Primary Examiner*—Alan Cohan
*Attorney*—Spensley, Horn and Lubitz

[57] ABSTRACT

A timer for actuating a device for a preselected period of time, and a timer valve incorporating said timer. The timer includes a windable driving spring engaged to a shaft. The shaft carries an actuator element such as a cam for actuating a device such as a valve. Turning the shaft in one direction winds the spring, and the wound spring will drive the shaft in the other direction. A clock-ring is rotatable in a reservoir that contains a silicone fluid. The silicone fluid fills a peripheral spacing between an outer wall on the clock-ring and an inner wall of the reservoir. The walls are concentric surfaces of revolution. A clutch couples the shaft and the clock-ring for mutual revolving motion, but enables them to be disengaged in at least one direction of rotation in order that the shaft may turn in that direction without the clock-ring. A preferred timer valve incorporated in this timer has its valve workings disposed in the flow passage of a conduit with a cam means of the timer also disposed therein.

17 Claims, 6 Drawing Figures

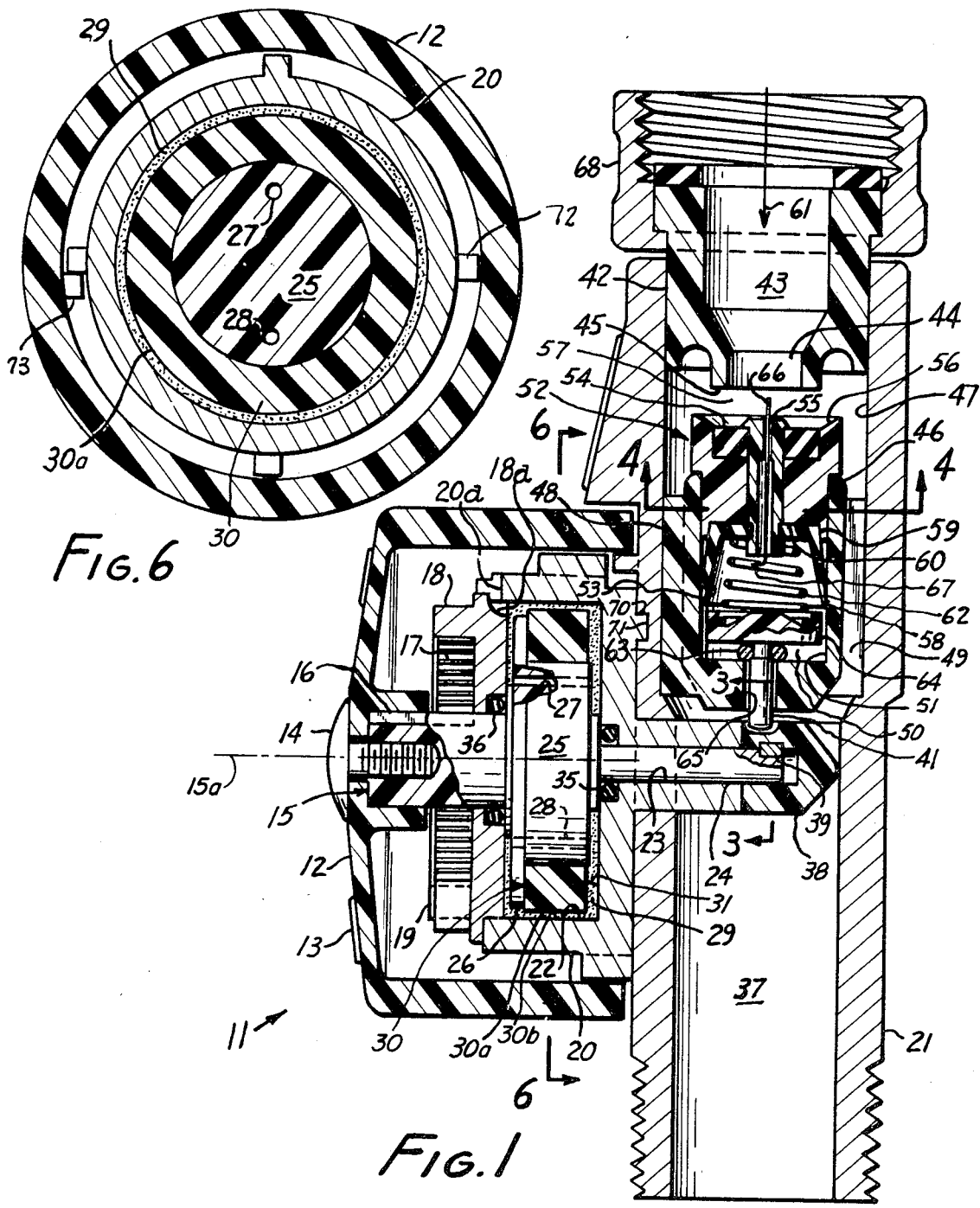

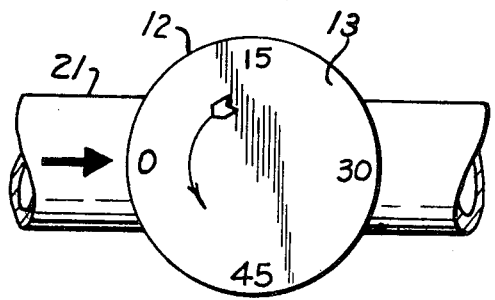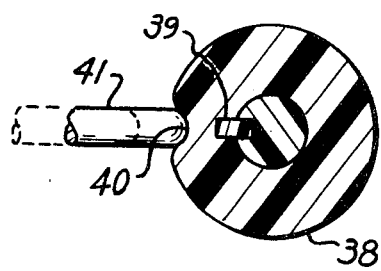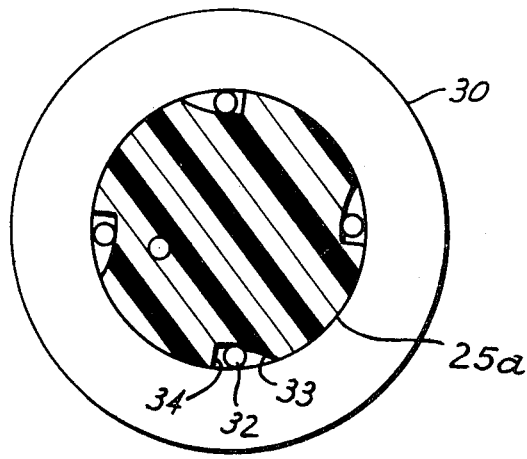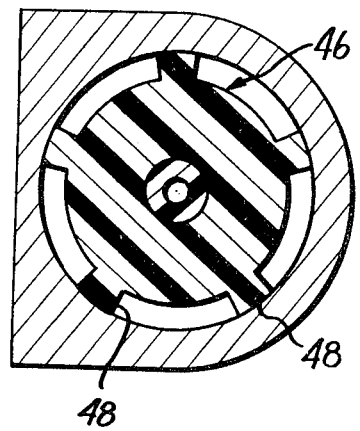

TIMER VALVE

This invention relates to a timer adaptable to the control of various devices, and to a timer valve incorporating this timer. Timers and timer valves are widely known in the art and have in common the provision of a valve in the stream of fluid to be controlled together with some timing device such as a clockwork mechanism which will cause the valve when opened to close at the expiration of a selected period of time.

Defects in the prior art valves are widely recognized, and in order to overcome them such mechanisms have become increasingly complicated, expensive to manufacture, and difficult to maintain. Furthermore, in general they are not resistant to the effects of their surroundings and there has not heretofore been provided an inexpensive rugged valve whose operation is not affected by normal atmospheric temperature changes, which valve can be inexpensively manufactured and readily set to rather close and variably selectable time settings. Also in the prior art, the valves have required substantial actuation forces, which have complicated the timer mechanism itself. Therefore a demand exists for an inexpensive device, accurate over wide pressure and temperature ranges which might for example be left exposed to the sun on a sprinkler system, in which both the actuating and operating forces of which may be minimal.

A previous effort to supply the shortcomings of the prior art is shown in U.S. Pat. No. 3,104,861, issued Sept. 24, 1963 to William T. Heyer and Frank Kepka. In this device, the rotation of a clock-ring in a silicone-filled reservoir is used to retard the rotation of a spring-driven shaft, thereby to determine the length of a period of time in which a valve is kept open. The timer of this device, and its valve also, while superior to the prior art devices, still has certain drawbacks. The instant invention overcomes these drawbacks.

In particular, in this invention the spring may be wound without turning the clock-ring in the silicone, and this feature results in surprisingly increased reliability of the timer. Further, when used as part of the timer valve, the valve workings may be arranged so that they are coaxial with and disposed in the water stream, thereby eliminating a change in direction of the stream with its attendant pressure drop and turbulence.

A timer according to this invention comprises a body with a reservoir enclosed therein. A peripheral inner wall in the body defines at leas part of the boundary of the reservoir. A shaft passes through the reservoir and has an axis of rotation. A clock-ring is disposed in the reservoir carried by the shaft. It has an outer wall, the walls and the shaft being coaxial. The walls are geometrically similar concentric surfaces of revolution which are at least partially axially aligned so as to form a peripheral spacing between themselves. Silicone fills this spacing and retards the rotation of the clock-ring relative to the inner wall.

A coil spring is connected to the body and to the shaft. It surrounds the shaft and is wound by rotation of the shaft in one direction and will drive the shaft in the other. Clutch means couples the clock-ring to the shaft for mutual rotation and is adapted to release the clock-ring from the shaft in at least one direction of rotation of the shaft. An actuator element having an actuated position and an unactuated position as a function of the rotational position of the shaft is carried by the shaft, and is adapted to actuate a device when in its said actuated position.

A timer valve according to this invention includes the aforesaid timer, together with valve workings disposed axially in the flow passage of a conduit including an axially shiftable seal adapted to move toward and away from a valve seat which is fixed in the conduit. The actuator means of the timer is also disposed in the flow passage.

The above and other features of this invention will be fully understood from the following detailed description and the accompanying drawings, in which:

FIG. 1 is a view principally in axial cross section of the presently preferred embodiment of the invention;

FIG. 2 is a partial plan view of FIG. 1;

FIGS. 3 and 4 are fragmentary cross sections taken on lines 3—3 and 4—4 respectively of FIG. 1;

FIG. 5 is cross section of a portion of an alternate embodiment which can be used in the device of FIG. 1; and FIG. 6 is a cross section taken on line 6—6 of FIG. 1.

In the presently preferred embodiment of the invention shown in FIG. 1 a timer element is used to actuate the pressure-balanced valve for controlling the flow of a fluid such as water through a conduit. The device as illustrated is a timer valve for use in irrigation systems or lawn sprinkler lines, and may for example conveniently be connected to an outlet faucet (not shown).

The timer element 11 includes a knob member 12 which is equipped with a dial face 13 which as can be seen in FIG. 2 may be calibrated in units of time such as minutes. A screw 14 secures the knob member 12 to a central shaft 15 which shaft carries the primary control elements of the system. A key 16 holds the knob (and therefore the dial) to central shaft 15 at an angularly determined position. A central shaft is rotatable around its central axis 15a.

A main spring 17 is attached at one end to, and is wound around, the central shaft 15. A slot 19 is provided in cap member 18 to receive the other end of spring 17. It will be seen that turning the knob clockwise in FIG. 1 will wind the spring, and that the spring will tend to exert a force to return the shaft in a counterclockwise direction.

Reservoir base member 20 is rigidly and nonrotatably mounted to valve body 21 with its axis normal to the valve body axis by cementing, or by any other convenient method. The cap member is circular in plan section as is the upper end of the reservoir base member. The cap member has a vent notch 18a on its periphery which may register with vent notch 20a in the reservoir base member when they are axially aligned. When axially aligned, these notches will allow for trapped air and excess silicone fluid to escape as the cap is assembled onto the base. After this assembly is completed, the cap is rotated a few degrees so that notches 18a and 20a are out of registration thereby closing the chamber. The cap will then be cemented to the same.

The closure of the notch-venting system and the fixing of the cap forms an enclosed reservoir chamber with a peripheral cylindrical wall 22. A bore 23 is coaxial with wall 22 and exits from the reservoir chamber. It is sized so as to journal central shaft 15 for rotation. Diameter 24 of shaft 15 nearly fits in the bore for this purpose.

Central shaft 15 also has an enlarged cylindrical section 25 which, at the end closest to the dial mounting is provided with a flange shoulder 26. One or more holes such as holes 27 and 28 are formed through the enlarged cylindrical section the purpose of which is to allow air and silicone fluid 29 to bleed therethrough when the assembly with the central shaft is installed in the reservoir member.

A clock-ring 30 which may in some installations simply comprise an integral portion of the central shaft is installed on the periphery of the cylindrical section 25 resting against the flange shoulder 26. It is rotated by the central shaft and is preferably spaced from bottom wall 31 of reservoir member 20. The clock-ring may in one embodiment be pressed on the cylindrical section 25. It is convenient to manufacture the device in this condition in order that a single central shaft may be manufactured, and clock-rings of different diameters may be provided in order to provide for different basic timing ranges with the use of the same remaining structure. The radial spacing between cylindrical wall 22 and the outer cylindrical wall 30a of the clock-ring is the primary determinant of the resistive viscous force that retards the rotation of the central shaft. The greater the spacing the more rapidly the shaft may move with the same applied force and the smaller the spacing the slower it will turn because the resistive force will increase with decreased clearance.

Inner wall 22 and outer wall 30 are concentric around the central axis 15a of the shaft. They are surfaces of revolution which are at least partially axially aligned with one another.

They are spaced from each other by a spacing 30b which is filled with silicone.

For relatively short intervals of timing such as perhaps one half hour in a device of conventional size, the spacing between the two walls is of the order of about one-sixteenth inch and the outer diameter of clock-ring 30 is approximately 1 inch. Its axial length is approximately one-half inch. A unitary construction where the clock-ring is unitarily fixed to the central shaft is quite suitable. However it has been found that if longer times are to be provided for which would require a smaller spacing between the cylindrical walls, it is burdensome to require the winding action to overcome both the force of the spring and the retarding effect of the silicone fluid. For that reason, clutch means can be provided between the clock-ring and the central shaft in order that the winding motion need only overcome the spring retardation, and then on the reverse motion the two elements will again be engaged and the spring will have to overcome the retarding affect of the silicone fluid.

For the above purpose, a clutch member 25a may be interposed between the central shaft and the clock-ring, one form of which is shown in FIG. 5. This is a standard roller sprag clutch which will permit the clock-ring to remain stationary in the silicone fluid while the dial is turned to wind the main spring 17 and rotate the central shaft. As soon as the dial is released and the main spring starts to unwind, the clutch rollers 32 will make engagement with the clock-ring 30 and with the sloped walls 33 of recesses 34 of the central shaft to engage the shaft and clock-ring and start the motion of the clock-ring through the silicone fluid 29. The retarding effect of the fluid controls the rate of unwinding of the main spring and in turn the length of the cycle.

Alternatively, when calibration with the cam actuator is not necessary, clutch means may be used between the dial knob and the central shaft thereby permitting a winding effect without rotating either the central shaft or the clock ring.

O-rings 35 and 36 are located in recesses in the reservoir member 20 and in the cap member 18 to seal against leakage of silicone fluid along the central shaft 15. It is the frictional effect of the clock-ring 30 being pulled through the silicone fluid by the central shaft 15 which provides the timing resistance. The silicone fluid 29 has the property of substantially constant frictional viscosity that enables the accurate calibration of this device, and this property changes only insignificantly with changes in temperature. For this reason it is quite useful for devices which will be exposed to varying temperatures such as outdoor sprinkler controls. It is interesting to note that the flat end faces of the timer ring and the central shaft in the silicone fluid have little if any retarding effect upon the rotation of the clock-ring. The primary retarding effect appears to be developed between the walls 22 and 30.

The reduced diameter 24 of the central shaft extends through the reservoir member into the fluid passage 37 of valve body 21. A cam member is mounted to the projecting end of the reduced diameter 24 and is keyed to shaft 15 by key 39. The low point 40 of cam 38 is located so as to be in contact with pilot stem 41 when the timer dial is set at zero time, and the valve will be closed at this condition.

The valve mechanism itself is enclosed in valve body 21, which has a fluid passage extending from top to bottom in FIG. 1, the top being the inlet in the illustration. Mounted at one end of the valve body 21 is a seat member 42 having a inlet chamber 43 which decreases in diameter so as to form inlet passage 44 through the valve seat 45. Valve cylinder 46 fits into an enlarged chamber 47 in fluid passage 37 in press fit relationship so as to prevent it sliding from its proper position under forces exerted by actuation and flow of fluid. Ribs 48 are disposed about the periphery of valve cylinder 46 so as to form fluid flow passages 49 that extend longitudinally along and bypass the valve cylinder 46. Valve cylinder 46 encloses a cavity 50 which is at least partially bounded by a cylindrical wall 51 that is aligned with its axis normal to the plane of inlet seat 46. This cavity 50 is in fluid communication with inlet seat 45 through a bias port 55 which extends from face to face of a piston assembly 52.

The piston assembly 52 makes a sliding, fluid sealing fit with the cylindrical wall 51 by means of a cup washer 53. This piston assembly 52 an integral structure which moves freely in the cavity 50 and divides the cavity into a bias chamber on the side of the piston element away from the inlet seat 45 and flow chamber facing the seat 45. A seal 54 is carried by the piston element and is adapted to make an abutting fluid sealing contact with the inlet seat in one position so as to close the valve, and to move away from the same to another position to permit fluid flow therethrough.

Seal 54 is preferably an elastomeric washer. The cup washer 53 at the other end of piston assembly 52 provides sliding sealing contact with wall 51 of valve cylinder 46. A bias port 55 of relatively small diameter provides for the constant fluid communication between inlet passage 44 and cavity 50 of valve cylinder 46.

To provide for fast opening of the valve even under low system pressures, an overhanging skirt 56 is formed on the seat end of piston assembly 52. The overhanging skirt 56 overhangs the seat 45 so that when the piston assembly moves off the seat an openmouthed cavity 57 faces the inlet seat 45, and full incoming system pressure tends then to be trapped over the entire face of the piston element thereby increasing the reactive force tending to move the piston assembly away from the inlet. This face has a larger area than the area in the bias chamber and thereby assists the quick movement of the piston element 52 so that the valve moves to its full open position rapidly even at low system pressures.

It has been found that careful attention to the maintenance of the shape of cup washer 53 under all operating conditions results in a more stable valve. The cup washer seals the cylinder cavity 50 by the slight deflection of a thin lip 58 whose relaxed condition is slightly larger in diameter than the diameter of the cylindrical cavity. The outer diameter of the lip in its relaxed condition is a few thousandths of an inch greater than the diameter of the cylinder in which it fits. It has been found that if fluid seeps under the heel of the cup washer, the lip will curl or peel away from the wall and permit seepage flow which could result in cycling the valve. For this reason the heel 59 is laterally restrained within a heel cavity 60, and this prevents the spreading of the heel and maintains the lip in smooth continuous peripheral contact under all operating conditions. Flow through the valve is along the direction of flow axis 61, and occurs straight through the valve body without making a lateral bend at the valve mechanism.

In its operation as a valve element, piston assembly 52 brings the elastomeric washer 54 against seat 45 thereby to close the inlet and shut off the flow. In this condition, system pressure flows through bias port 55 to bias the underside of the cup washer and press the washer 54 against seat 45.

Cavity 50 is can be closed by an O-ring 63 seated in a groove around the pilot stem. When the pilot stem is at the position shown in FIG. 1, as determined by the low point on the cam member, this seal will close the cavity. Should the valve stem 51 be shifted axially such as by rotating the cam, then fluid can flow through the clearance between the pilot stem and the wall of the vent passage 65 to vent the bias chamber. The device is shown in an indeterminate position in FIG. 1 for convenience of disclosure. In this figure it has been shown with the vent passage closed and passage 44 open. This condition would occur during normal use only when the stem is shifted axially and passage 65 is opened. In the stem position shown, the valve would be closed in normal usage.

Pilot stem 41 is mounted to a spring backing member 64. The diameter of stem 41 is less than that of vent passage 65, and provides a clearance so that when the stem is shifted there can be flow from chamber 50 through the vent port so as to drop the pressure in chamber 50 toward the downstream pressure. A spring 62 bears against the backing member and against the base of the cup washer. In its relaxed condition the bias spring is sufficiently long so that it would extend far enough to cause the piston member to bias the elastomeric washer 54 against the seat and also bias O-ring 63 against the base of member 51.

A cleaning pin 66 passes through the bias port to keep this port clean and to provide a convenient sizing means for establishing the effective flow area.

The operation of the valve mechanism should be evident for the foregoing. With pressure on in the inlet port 43, and with pilot stem 41 in the condition shown, the spring 62 will bias the piston assembly toward seat 45 and this will be assisted by system pressure within chamber 50. The result of this will be closure of the valve. Now for the valve member to be opened, the cam member would be turned so as to shift the pilot stem and open vent port 65. This will lower the pressure in bias chamber 50, but system pressure continues to exist across the face of washer 54. This differential pressure will then immediately move the piston assembly down to the position shown in FIG. 1 and flow will occur through channels 49 so long as the pilot stem is held in its shifted position. When the cam is returned to the position shown in FIG. 1, then passage 65 is closed and system pressure is exerted again in cavity 50 which causes pressure in this chamber to rise to a value which is at least as great and perhaps greater than that passing through the flow chamber. This plus the force of the bias spring will cause the piston assembly to move the seal 54 up and close the inlet port. It will thereby be seen that flow through this device is occasioned by rotation of the cam member.

As to the timer portion, if no clutch is used, the knob is simply turned against the resistive force of the coil spring and of the retarding effect of the silicone thereby opening the valve and determining the valve-open time as a function of the extent of the rotation.

Should a clutch have been interposed between the clock-ring and the central shaft, this rotation will leave the clock-ring behind and wind the spring and then the clutch will couple the two on the reverse motion. Several conveniences in design and construction are illustrated in the drawings. A tongue and groove 70, 71 respectively are formed between bodies 20 and 21 to align these together, and as can best be seen in FIG. 6, alignment splines 72 may be formed on the outside of body 20 to guide the overhanging knob and one of which may be longer than the others so as to engage another spline 73 on the knob to limit the extent of its rotation so that it cannot be turned more than 360°.

There is provided by this construction a rugged and reliable timer valve system which may be put to a variety of uses, which is simple to manufacture, and which requires virtually no service of attention.

This invention is not to be limited by the embodiment shown in the drawings and described in the description which is given by way of example and not of limitation but only in accordance with the scope of the appended claims.

We claim:

1. A timer for actuating a device for a selected period of time, comprising: a body; a reservoir formed by and enclosed within said body; a peripheral inner wall in the body defining at least part of the boundary of the reservoir; a shaft passing through the reservoir and having an axis of rotation; a clock-ring in the reservoir carried by the shaft having an outer wall, the walls being geometrically similar coaxial surfaces of revolution formed around the axis of the shaft, and forming a peripheral spacing between themselves; a viscous silicone filling the said spacing and retarding the rotation of the clock-ring relative to the inner wall; a coil spring connected to the body and to the shaft, said spring surrounding the shaft and arranged to be wound by rotation of the shaft in one direction and to drive the shaft in the other direction; clutch means coupling the clock-ring to the shaft for mutual rotation in at least one direction and adapted to release the clock-ring from the shaft in at least one direction of rotation of the shaft; and an actuator element mounted to the shaft having an actuated position and an unactuated position as a function of the rotational position of the shaft, and adapted to actuate said device when in its said actuated position.

2. A timer according to claim 1 in which said spring is disposed outside the said reservoir.

3. A timer according to claim 1 in which the said body comprises a base member and a cap member, each said member having a vent groove, said grooves being open and aligned in one relative rotational position of the members and closed and unaligned in another relative rotational position, whereby excess silicone in the reservoir may be vented from the reservoir when the members are in said aligned position, and the reservoir may be closed in the unaligned position thereby to confine a desired quantity of silicone in said reservoir.

4. A timer according to claim 3 in which said spring is disposed outside the said reservoir.

5. A timer according to claim 1 in which the actuator means is a cam which is mounted to said shaft for rotation by it, said cam having portions with different lateral spacings from the axis of the shaft whereby to actuate a follower which bears against it.

6. A timer according to claim 5 in which said spring is disposed outside the said reservoir.

7. A timer according to claim 5 in which the said body comprises a base member and a cap member, each said member having a vent groove, said grooves being open and aligned in one relative rotational position of the members and closed and unaligned in another relative rotational position, whereby excess silicone in the reservoir may be vented from the reservoir when the members are in said aligned position, and the reservoir may be closed in the unaligned position thereby to confine a desired quantity of silicone in said reservoir.

8. A timer according to claim 7 in which said spring is disposed outside the said reservoir.

9. A timer valve adapted normally to be closed, and to be opened for a selected period of time by a timer, comprising: a body; a reservoir formed by and enclosed within said body, a peripheral inner wall in the body defining at least part of the boundary of the reservoir; a shaft passing through the reservoir and having an axis of rotation; a clock-ring in the reservoir carried by the shaft having an outer wall, the walls being geometrically similar concentric surfaces of revolution which are at least partially axially aligned whereby to form a peripheral spacing between themselves; a viscous silicone filling the said spacing and retarding the rotation of the clock-ring relative to the inner wall; a coil spring connected to the body and to the shaft, said spring surrounding the shaft and arranged to be wound by rotation of the shaft in one direction to store energy and to drive the shaft in the other direction; a conduit enclosing a fluid passage through which the flow of fluid is to be controlled by said timer valve, said passage having a flow axis, the axes of the shaft and of the flow passage intersecting and lying normal to each other, said body being mounted on said conduit with a shaft projecting into said flow passage; a cam in said flow passage fixed to the shaft for rotation thereby; a pair of control surfaces on said cam at different radial distances from the axis of said shaft; a valve seat fixed in said conduit and extending peripherally around said flow axis; and axially shiftable seal adapted to move to open or to close said valve seat; piston and cylinder in said flow passage, said piston being disposed in said cylinder and connected to said seal so as to move it toward and away from said valve seat, said flow passage bypassing said piston and cylinder; a bias port passing through said piston so as to interconnect the upstream and downstream faces thereof; an axially shiftable pilot valve means movable along the flow axis engageable by the cam selectively to vent the downstream face of the piston to downstream pressure or to close it and maintain upstream pressure against said downstream face.

10. A timer valve according to claim 9 in which said spring is disposed outside of said reservoir.

11. A timer valve according to claim 9 in which the said body comprises a base member and a cap member, each said member having a vent groove, said grooves being open and aligned in one relative rotational position of the members and closed and unaligned in another relative rotational position, whereby excess silicone in the reservoir may be vented from the reservoir when the members are in said aligned position, and the reservoir may be closed in the unaligned position to confine a desired quantity of silicone in said reservoir.

12. A timer valve according to claim 11 in which said spring is disposed outside of said reservoir.

13. A timer valve adapted normally to be closed and to be opened for a selected period of time, comprising: a body; a reservoir formed by and enclosed within said body, a peripheral inner wall in the body defining at least part of the boundary of the reservoir; a shaft passing through the reservoir and having an axis of rotation; a clock-ring in the reservoir carried by the shaft having an outer wall, the walls being geometrically similar coaxial surfaces of revolution formed around the axis of the shaft, forming a peripheral spacing between themselves a viscous silicone filling the said spacing and retarding the rotation of the clock-ring relative to the inner wall; a coil spring connected to the body and to the shaft, said spring surrounding the shaft and arranged to be wound by rotation of the shaft in one direction and to drive the shaft in the other direction; clutch means coupling the clock-ring to the shaft for mutual rotation in at least one direction and adapted to release the clock-ring from the shaft in at least one direction of rotation of the shaft; a conduit enclosing a fluid passage through which flow of fluid is to be controlled by said timer valve, said passage having a flow axis; valve workings in said passage to control said flow; an actuator for controlling said valve; and cam means fixed to the shaft for rotation therewith and enclosed in said flow passage so disposed and arranged as to actuate said actuator as a function of the rotary position of the shaft, whereby to select the valve's open or closed position as a function of the rotary position of the shaft.

14. A timer valve according to claim 13 in which the axes of the shaft and of the flow passage intersect and lie normal to each other, the body being mounted to said conduit with the shaft projecting into said flow passage, said valve including a valve seat fixed in said conduit and extending peripherally around said flow axis, an axially shiftable seal adapted to move to open or to close said valve seat, a piston and a cylinder in said flow passage, said piston being disposed in said cylinder, said piston being connected to said seal so as to move it toward and away from said valve seat, said flow passage bypassing said piston and cylinder, a bias port passing through the piston so as to interconnect the upstream and downstream faces of the piston, an axially shiftable pilot valve movable along the flow axis engageable by the cam selectively to vent the downstream face of the piston to downstream pressure or to close it and maintain upstream pressure against said face.

15. A timer valve according to claim 14 in which said spring is disposed outside of said reservoir.

16. A timer valve according to claim 14 in which the said body comprises a base member and a cap member, each said member having a vent groove, said grooves being open and aligned in one relative rotational position of the members and closed and unaligned in another relative rotational position, whereby excess silicone in the reservoir may be vented from the reservoir when the members are is said aligned position, and the reservoir may be closed in the unaligned position to confine a desired quantity of silicone in said reservoir.

17. A timer valve according to claim 16 in which said spring is disposed outside of said reservoir.

* * * * *